US010243905B2

United States Patent
Daniel et al.

(10) Patent No.: US 10,243,905 B2
(45) Date of Patent: Mar. 26, 2019

(54) LOCATION-BASED CONVERSATION ENGINE FOR ENTITIES IN A SOCIAL NETWORKING SYSTEM

(71) Applicant: Facebook, Inc., Menlo Park, CA (US)

(72) Inventors: Robert Franklin Daniel, Redwood City, CA (US); Deniz Demir, Sunnyvale, CA (US); Ming Xiao, Mountain View, CA (US); Michael Allen Sherron, San Mateo, CA (US); Yoram Talmor, Cupertino, CA (US)

(73) Assignee: FACEBOOK, INC., Menlo Park, CA (US)

( * ) Notice: Subject to any disclaimer, the term of this patent is extended or adjusted under 35 U.S.C. 154(b) by 246 days.

(21) Appl. No.: 15/063,255

(22) Filed: Mar. 7, 2016

(65) Prior Publication Data
US 2017/0257336 A1  Sep. 7, 2017

(51) Int. Cl.
*H04L 12/58* (2006.01)
*H04W 4/02* (2018.01)

(52) U.S. Cl.
CPC .............. *H04L 51/16* (2013.01); *H04L 51/32* (2013.01); *H04W 4/02* (2013.01)

(58) Field of Classification Search
CPC ...... G06F 15/16; G06F 21/00; G06F 19/3418; H04L 67/02; H04L 29/06; H04L 51/043
USPC .......................................... 709/206; 304/815
See application file for complete search history.

(56) References Cited

U.S. PATENT DOCUMENTS

| 8,369,842 | B2* | 2/2013 | Proctor, Jr. | H04W 4/029 455/414.3 |
| 2013/0159021 | A1* | 6/2013 | Felsher | G06F 19/328 705/3 |
| 2014/0279435 | A1* | 9/2014 | Holman | G06Q 20/12 705/39 |
| 2014/0317502 | A1* | 10/2014 | Brown | G06F 9/453 715/706 |
| 2014/0368601 | A1* | 12/2014 | deCharms | H04W 4/021 348/14.02 |
| 2015/0120555 | A1* | 4/2015 | Jung | G06Q 20/40 705/44 |
| 2015/0279172 | A1* | 10/2015 | Hyde | G06Q 10/10 340/815.4 |

(Continued)

*Primary Examiner* — Tesfay Yohannes
(74) *Attorney, Agent, or Firm* — Keller Jolley Preece

(57) ABSTRACT

Various embodiments include a conversation engine for facilitating a conversation between member accounts (e.g., personal accounts) and social network entities (e.g., corporate accounts) in a social networking system. The conversation engine can enable interactions between a member account and a social network entity via a messaging application when an end-user device associated with the member account is in proximity to a physical establishment associated with the social network entity. The end-user device can scan for available access points and determine its location based on the wireless source identifier(s) of the available access points. The end-user device and/or the social networking system can compare the wireless source identifier(s) to a set of known wireless source identifiers to determine the end-user device's location. Messages can be generated by the conversation engine that include content that is generated based at least in part on the location of the end-user device.

20 Claims, 7 Drawing Sheets

(56) References Cited

U.S. PATENT DOCUMENTS

| | | | |
|---|---|---|---|
| 2016/0029158 A1* | 1/2016 | Hansen | G16H 40/67 455/456.1 |
| 2016/0063097 A1* | 3/2016 | Brown | G06F 17/30713 707/737 |
| 2016/0127293 A1* | 5/2016 | Song | H04L 51/18 235/435 |
| 2016/0232515 A1* | 8/2016 | Jhas | G06Q 30/02 |
| 2016/0260067 A1* | 9/2016 | Holman | G06Q 20/227 |

* cited by examiner

LOCATION-BASED CONVERSATION ENGINE FOR ENTITIES IN A SOCIAL NETWORKING SYSTEM

BACKGROUND

A social networking system typically provides mechanisms for members to communicate, directly or indirectly, with one another using end-user devices (e.g., smartphones, tablets, personal computers). End-user devices utilize these mechanisms by accessing the social network system via native applications or web browsers. Oftentimes, these mechanisms utilize location data provided by an information service to determine the location of the end-user device, which can then be used control certain features supported by the social networking system. For example, the location can be used by the social networking system for a "check in" feature that enables the end user associated with the end-user device to specify a current location.

Location data can be retrieved from numerous sources. For example, the location of an end-user device can be determined based on a city identified in the end user's profile, Global Positioning System (GPS) coordinates included in the location information, the Internet Protocol (IP) address of the end-user device, aggregated information about the location of the end user's friends (in the social networking sense), data from the end-user device if location services are enabled, etc. But these techniques typically require that the end user either enable sharing of the location data with the social networking system, or that the native application be actively executed by the operating system by the end-user device (also known as being "executed in the foreground").

Figure 1:
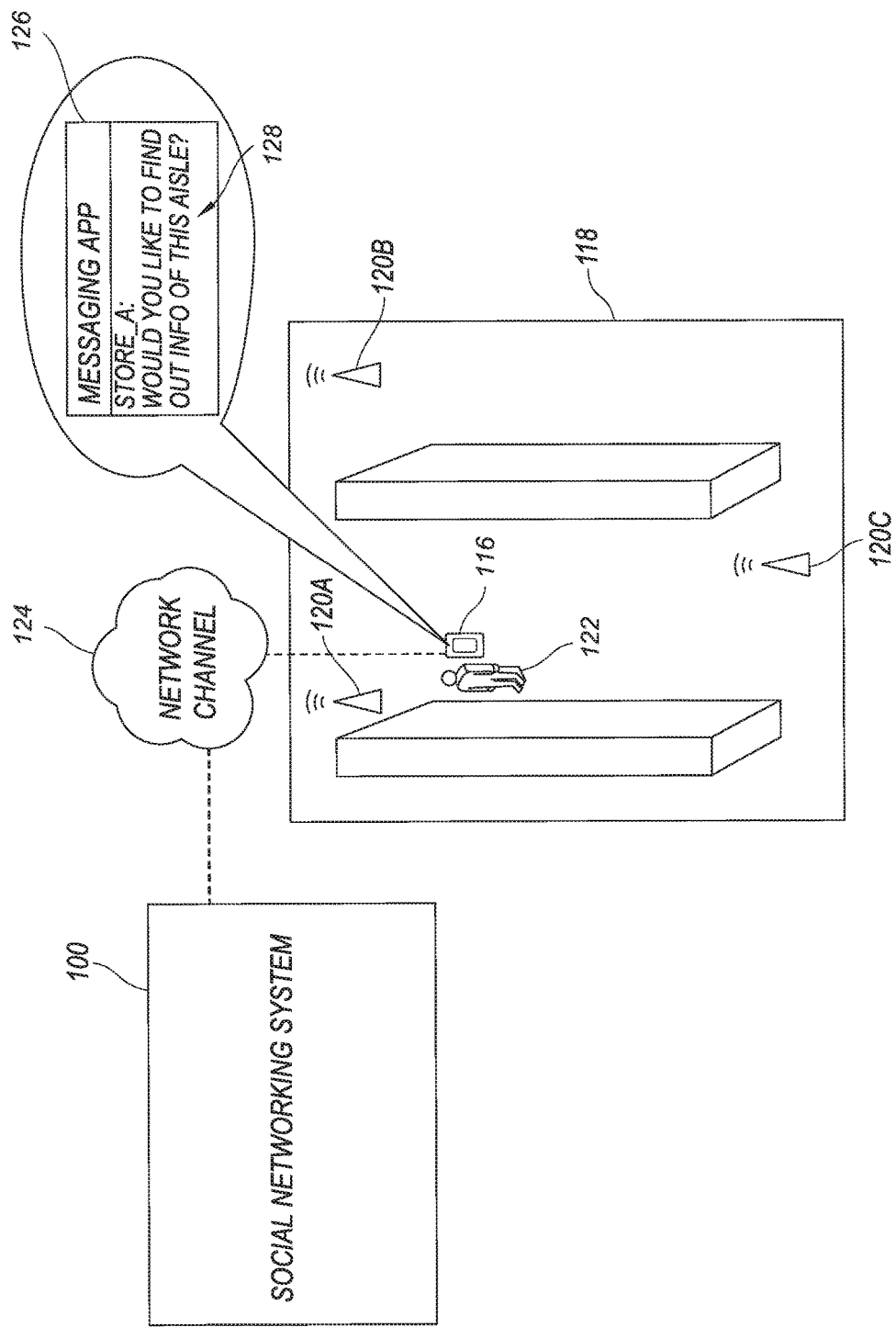
FIG. 1 is an illustrative diagram depicting a general topology of a network environment in which a messaging service associated with a social networking system is executed by an end-user device, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of the embodiments described herein.

DETAILED DESCRIPTION

Various embodiments disclose a messaging system that is associated with a social networking system and enables location-based conversation triggers. More specifically, the messaging system enables member accounts of the social networking system to more readily interact with a social network entity (e.g., the social networking presence of a company) through an application. For example, the application (e.g., a messaging application or another application associated with the social network system) can be executed by an end-user device that periodically retrieves location information (e.g., the wireless source identifiers for nearby access points or GPS information). The end-user device can be associated with an end user, who corresponds to a particular member account of the social networking system.

In some embodiments, the application executing on the end-user device receives a list of wireless source identifiers from the social networking system. The list can be, for example, a subset of wireless source identifiers maintained by the social networking system. The subset may be determined based on information in the end user's social networking profile and/or a social graph associated with the member account (e.g., the end-user). Each of the wireless source identifiers can be a basic service set identifier (BSSID) that uniquely or substantially uniquely identifies a wireless access point (WAP).

As the end-user device travels to different geographic locations, the end-user device can scan for nearby wireless connection sources (e.g., WAPs) and receive a signal from each discovered wireless connection source. Each signal may include a wireless source identifier that uniquely identifies the wireless connection source responsible for transmitting the signal. An application (e.g., the messaging application or the social networking application) can then determine whether the wireless source identifier in the signal matches one of the wireless source identifiers on the list received from the social networking system. The application can estimate the location of the end-user device based on a location-based identifier (e.g., a region ID in a physical establishment of a social network entity, a coordinate within an area of the physical establishment, a physical establishment identifier associated with the social network entity, or any combination thereof) associated with a matching wireless source identifier. Each of the wireless source identifiers can be associated with at least one social network entity. The application may also request a traversal of a social graph of the social network system to identify a social network entity (e.g., a social network "page" associated with a business) that corresponds to the location-based identifier.

The messaging system can initiate and/or carry on a conversation between the social network entity and a member account associated with the end user of the end-user device in response to identifying the social network entity. The messaging system can configure a conversation engine that serves as an artificial intelligence that represents the social network entity. The conversation engine can generate and/or select content in messages used to interact with the member account. For example, a message can be generated and presented to the end user (e.g., by the messaging application) that includes information related to the social network entity. Examples of such information can include an advertisement, a promotion, an entity-related announcement, an entity-specific sign-in confirmation (e.g., for a loyalty program), an electronic menu, a customer service greeting, an accessibility/facility description, or any combination thereof.

Turning now to the figures, FIG. 1 is an illustrative diagram depicting a general topology of a network environment in which a messaging application 126 associated with a social networking system 100 is executed by an end-user device 116, in accordance with various embodiments. The social networking system 100 enables social network entities (e.g., companies having a social media presence) to communicate and interact with member accounts associated with individual end users via an application that executes on the end-user devices. For example, the messaging application 126 can be used to facilitate customer service (e.g., by enabling a social network entity and a member account 122 associated with an end user to converse with one another), provide information (e.g., notifications regarding sales or available coupons), etc.

End-user devices often periodically scan for available WAPs within the local environment. Consequently, when the end-user device 116 is in or near a physical establishment 118, the end-user device 116 may attempt to determine whether any WAPs are available. The end-user device 116 can receive signals from multiple WAPs, a single WAP, or no WAPs at all. Here, for example, the end-user device 116 receives distinct signals broadcast by WAPs 120A-C. Each of the distinct signals includes a wireless source identifier (e.g., BSSID) that uniquely identifies the WAP responsible for transmitting the signal and can be recognized by the end-user device 116.

The basic service set (BSS) of a wireless local area network (LAN) includes a single WAP together with any associated stations. Each BSS (and thus each WAP) is uniquely identified by a based service set identifier (BSSID), which serves as the formal name of the BSS. For example, the BSSID of a WAP may be generated by combining a 24-bit Organization Unique Identifier and a manufacturer's assigned 24-bit identifier for the radio chipset in the WAP.

The signals emitted by the WAP(s), as well as the unique wireless source identifier(s), can be used to determine where the end-user device 116 is within the physical establishment 118. More specifically, the end-user device 116 and/or the social networking system 100 can establish the location of the end-user device 116 using a heuristic rule based on one or more factors (e.g., the strength of each signal or the time window during which the signal is available). For example, if the strength of the signal received from WAP 120A is above a threshold for a certain period of time, the end-user device 116 may determine that the end-user device 116 is in or near the physical establishment 118 (rather than simply passing by the physical establishment 118). As another example, if the strength of the signal received from WAP 120A is higher than the strength of the signal received from WAP 120C, the end-user device 116 may determine that the end-user device 116 is closer to WAP 120A.

A message 128 can be generated in response to determining the end-user device 116 is in or near the physical establishment 118. In some embodiments, the content of the message 128 is based at least in part of the location of the end-user device 116. For example, the message 128 may include information (e.g., an advertisement, promotion, or customer service greeting) related to a social network entity associated with the physical establishment 118. The information can also be tailored for the member account 122 associated with the end-user device 116 based on a more specific determination of location within the physical establishment 118. For example, the member account 122 can be notified of coupons for items in a particular aisle or department of the physical establishment 118.

Figure 2:
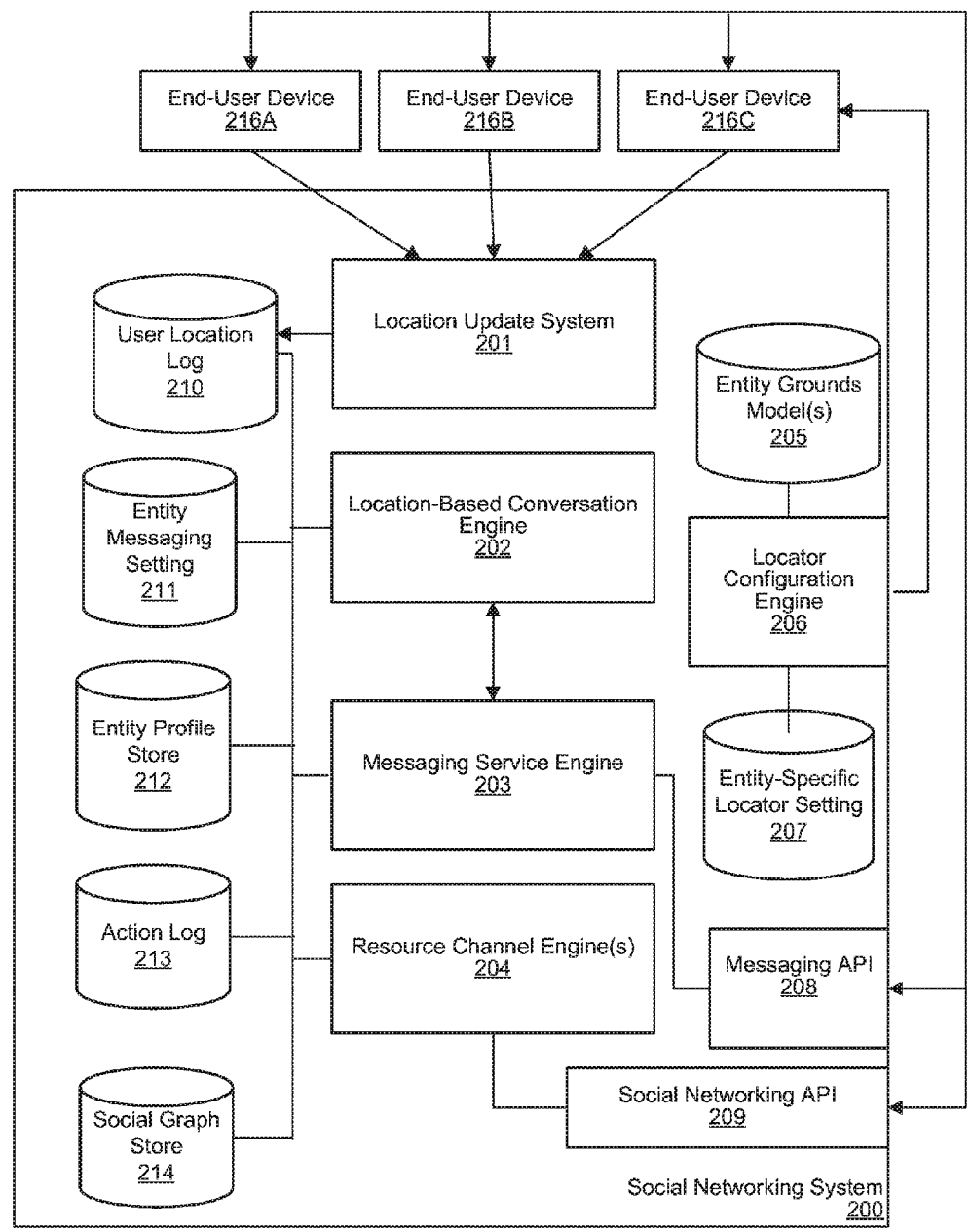
FIG. 2 is a block diagram illustrating a social networking system implementing a location-based conversation engine for a social network entity, in accordance with various embodiments.

FIG. 2 is a block diagram illustrating a social networking system 200 (e.g., the social networking system 100) implementing a location-based conversation engine 202 for a social network entity, in accordance with various embodiments. The social networking system 200 enables its member accounts (e.g., personal accounts for end users) to communicate and interact with one another. Member accounts can add social connections to a number of other member accounts to whom they desire to be connected in the social networking system 200. As used herein, the term "friend" refers to any other member account to whom a member account has formed a connection, association, or relationship via the social networking system 200. Connections may be added explicitly by a member account (e.g., by selecting a particular other member to be a friend) or automatically created by the social networking system 200 based on common characteristics shared by multiple member accounts (e.g., reside in the same geographical area).

The member accounts can communicate with one another via a messaging application programming interface (API) 208 and/or a social networking API 209. The social networking system 200 can provide application services to end-user devices 216A-C when the end-user devices 216A-C execute a social networking application or a messaging application. The messaging API 208 and the social networking API 209 can support application services accessible by the end-user devices 216A-C through native applications executed by the operating systems of the end-user devices 216A-C. For example, the messaging API 208 can link a messaging service engine 203, which enables a messaging application running on one of the end-user devices 216A-C. Similarly, the social networking API 209 can link one or more resource channel engines 204, which enable(s) a social networking application running on one of the end-user devices 216A-C. For example, the messaging service engine 203 provides a platform for member accounts (e.g., personal member accounts and privileged member accounts, such as corporate or organizational social network entities) to exchange messages (e.g., text messages, audio messages, video messages, or any combination thereof) with each other. The resource channel engine 204 can provide facilitate the social networking system to push notifications, newsfeeds, alerts, and updates to the end-user devices 216A-C.

Together, the resource channel engine(s) 204 and the messaging service engine 203 enable member accounts to interact with one another in different ways (e.g., by interacting with social network objects or creating messages). Although the resource channel engine(s) 204 and the messaging service engine 203 are described herein as being associated with different applications, they can also be associated with different functionalities of the same application executed by an end-user device.

As member accounts of the social networking system 200 interact with social network objects via the messaging API 208 and/or the social networking API 209, the social networking system 200 can store records of these interactions in an action log 213. Each action may be associated with one or more social network objects. The types of actions that a member account may perform in connection with a social network object is defined for each social network object and can depend on the type of item (e.g., group type, event type, application type, profile type) represented by the social network object. Actions may include, for example, adding a connection to another member account, sending a message to another member account, reading a message from another member account, viewing content associated with another member account, attending an event posted by another member account, etc. Any social network objects and actions/activities discussed herein are provided for illustration purposes only, and it can be appreciated that any number of variations and features can be provided in the social networking system 200.

The actions can be tracked in the action log 213 and processed as connections between member accounts represented in a social graph, which can be maintained in the social graph store 214. In some embodiments, the tracked actions are associated with each member account's account profile. The social networking system 200 can maintain separate account profiles for each of its member accounts (e.g., personal accounts and corporate accounts, such as privileged social network entities) in an entity profile store 212.

The end-user devices 216A-C can scan (e.g., according to a periodic schedule or other deterministic schedule) for signals emitted by local WAPs. Each of these signals often includes location information (e.g., a wireless source identifier that uniquely identifies the WAP responsible for emitting the signal). At least some of the location information can be transmitted to the social networking system 200 for processing by a location update system 201, which may be able to determine the location of the end-user device based at least in part on the location information. In some embodiments, the location update system 201 stores some or all of the location information in a user location log 210 associated with the end-user device.

A location-based conversation engine 202 can be configured to generate a message to be transmitted to the end-user device (e.g., by the messaging service engine 203 via the messaging API 208) based on the location information. The message may initiate a conversation between a social network entity and a member account associated with the end user of the end-user device, or may be part of a larger conversation thread. In some embodiments, the location-based conversation engine 202 tailors the content of the message based on the previous or current location of the end-user device. For example, the message can prompt the end user to rate the shopping experience at a physical establishment or ask whether the end user would like to receive coupons for the physical establishment.

Entity messaging settings 211 may influence how or when the message is generated, the content of the message, etc. For example, the entity messaging settings 211 may configure the location-based conversation engine 202 to generate a message in response to the location update system 201 determining that the end-user device has been within a physical establishment for a predetermined period of time.

As further described below with respect to FIG. 4, one or more entity grounds models 205 can be maintained by the social networking system 200 and transmitted by a locator configuration engine 206 to an end-user device. Each of the entity grounds models includes a mapping of a physical establishment associated with a social network entity to one or more wireless source identifiers. For example, a small establishment can be mapped to a single BSSID, while a large establishment may be mapped to multiple BSSIDs that correspond to different departments, aisles, etc.

Each entity grounds model is associated with an entity-specific locator setting 207 that can include a social network entity identifier, an entity grounds model identifier, and a flag that specifies whether location services are enables for the corresponding physical establishment. The locator configuration engine 206 manages the entity grounds model(s) 205 and entity-specific locator setting(s) 207 maintained by the social networking system 200. In some embodiments, the locator configuration engine 206 transmits at least some of the entity grounds model(s) 205 and/or entity-specific locator setting(s) 207 to an end-user device (e.g., end-user device 216C), which can enable the end-user device to determine its location based on the wireless source identifier embedded within the signal emitted by each WAP in a physical establishment. The locator configuration engine 206 may be configured to transmit a list of wireless source identifiers to the end-user devices 216A-C or the entity grounds model(s) 205 themselves.

Figure 3:
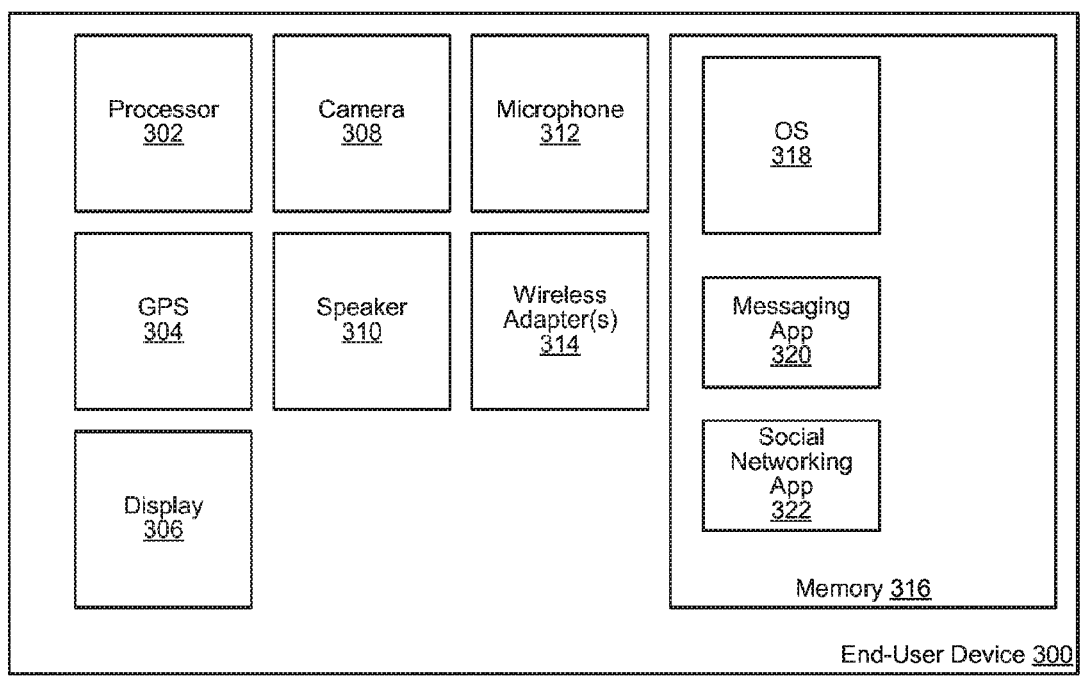
FIG. 3 is a block diagram depicting an end-user device capable of accessing a social networking system via a social networking application executed by the operating system, in accordance with various embodiments.

FIG. 3 is a block diagram depicting an end-user device 300 capable of accessing a social networking system (e.g., the social networking system 100 and/or the social networking system 200) via a social networking application 322 executed by the operating system 318, in accordance with various embodiments. The end-user device 300 can include a processor 302, a GPS module 304, a display 306, a camera 308, a speaker 310, a microphone 312, one or more wireless adapters 314, a memory 316, or any combination thereof. The wireless adapter(s) 314 can be configured to communicate with external devices (e.g., WAPs or cellular antennas). For example, the wireless adapter(s) may be configured to receive signals from local WAPs that include location information (e.g., wireless source identifiers).

The GPS module 304, camera 308, and microphone 312 may also be configured to acquire information that can be used to determine the location of the end-user device 300. For example, the GPS module may acquire GPS coordinates, and then cause the GPS coordinates to be transmitted to the social networking system (e.g., via the social networking application 322). As another example, the camera 308 and/or microphone 312 may periodically capture visual and audible information that can be used to help determine location of the end-user device 300.

Because end users often elect to turn off location-based services that employ conventional methodologies (e.g., GPS), the social networking application 322 may implement software code that causes the operating system 318 to automatically pass data to the social networking application 322 and/or messaging application 320. The software code that causes the data to be diverted away from the operating system 318 can be called a "hook." Consequently, when the end-user device 300 receives a signal from a WAP that includes a wireless source identifier, the operating system 318 can automatically pass the wireless source identifier to the social networking application 322 and/or the messaging application 320 for transmission to the social networking system. Unlike the conventional methodologies described above, the "hook" enables the social networking system to receive location information (e.g., wireless source identifiers) even if the social networking application 322 and the messaging application 320 are not active (i.e., are not being executed in the foreground by the operating system 318).

The social networking system can generate a message based on the wireless source identifier, and then transmit the message to the end-user device 300 for display by the messaging application 320. The content of the message can be specified by a social network entity or, alternatively, can be created by the social networking system on behalf of the social network entity. This technique enables the social network entity to readily interact (via the messaging application 320) with the member accounts of end users who are in or near a physical establishment associated with the social network entity.

Functional/logic components (e.g., applications, engines, modules, and databases) associated with the social networking system 100, the social networking system 200, and/or the end-user device 300 can be implemented as circuitry, firmware, software, or other functional instructions. For example, the functional/logic components can be implemented in the form of special-purpose circuitry, in the form of one or more appropriately programmed processors, a single board chip, a field programmable gate array, a network-capable computing device, a virtual machine, a cloud computing environment, or any combination thereof. The functional/logic components described herein can also be implemented as instructions in a tangible storage memory capable of being executed by a processor or another integrated circuit chip. The tangible storage memory may be volatile or non-volatile memory. In some embodiments, the volatile memory may be considered "non-transitory" in the sense that it is not a transitory signal. The memory space and storages depicted in the figures (e.g., memory 316 of FIG. 3) can be implemented as tangible storage memory as well, including volatile or non-volatile memory.

Each of the functional/logic components may operate individually and independently of other functional/logic components. Some or all of the functional/logic components may be executed on the same host device or on separate devices. For example, functional/logic components can be executed by the end-user device 116, the social networking system 100, or both. Separate devices can be coupled through one or more communication channels (e.g., wireless or wired network channel 124) to coordinate their operations. Some or all of the functional/logic components may be combined as one component. A single functional/logic component may be divided into sub-components responsible for different tasks.

In some embodiments, at least some of the functional/logic components share access to a memory space. For example, one functional/logic component may access data accessed or transformed by another functional/logic component. The functional/logic components may be considered "coupled" to one another if they share a (direct or indirect) physical connection or a virtual connection that enables data accessed by one functional/logic component to be accessed by another functional/logic component. In some embodiments, at least some of the functional/logic components can be upgraded or modified remotely (e.g., by reconfiguring executable instructions that implement one or more functional/logic components). The systems, engines, or devices described herein may include additional, fewer, or different functional/logic components for various applications.

Figure 4:
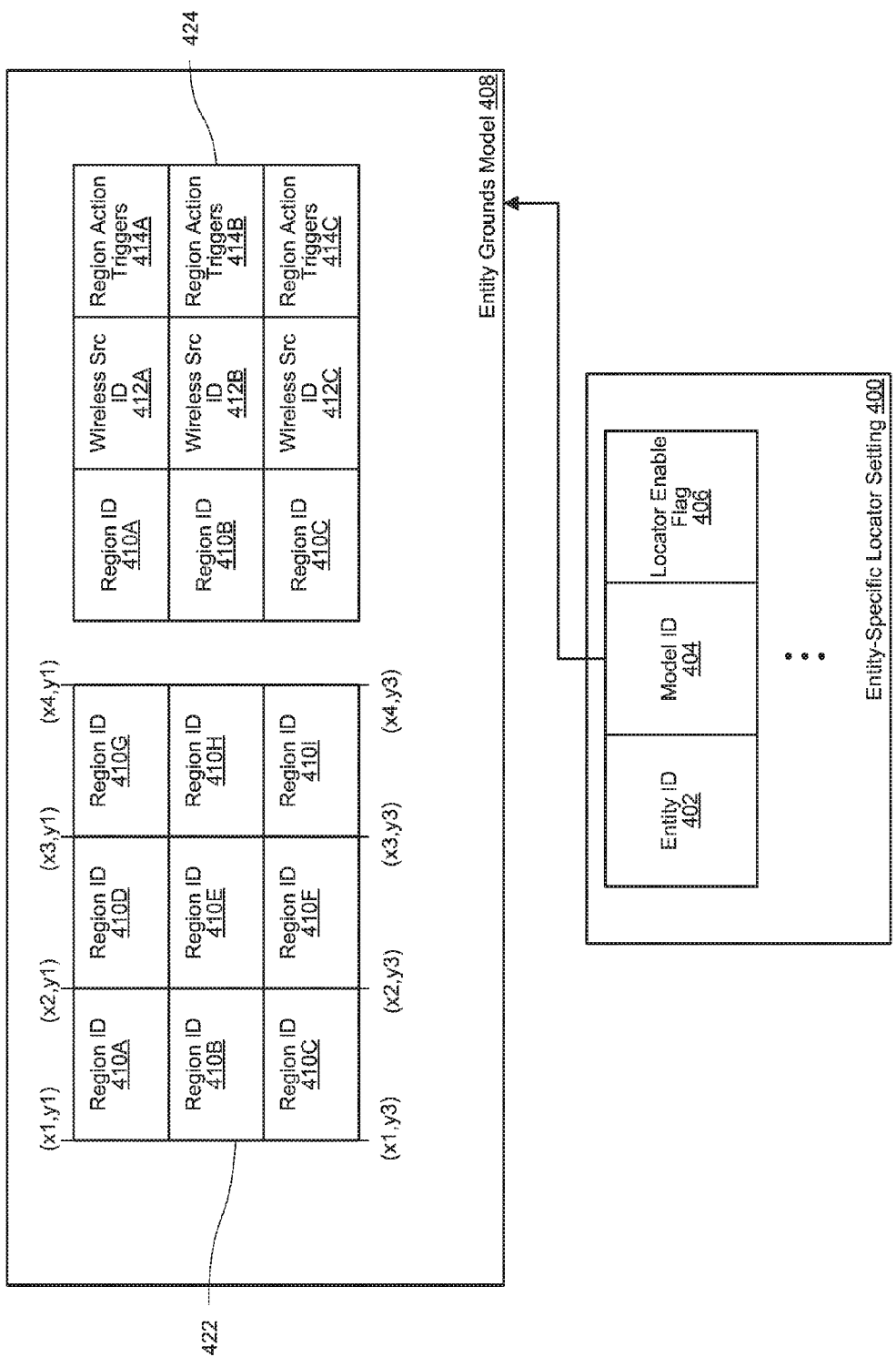
FIG. 4 is a block diagram illustrating an entity-specific locator setting and an entity grounds model, in accordance with various embodiments.

FIG. 4 is a block diagram depicting an entity-specific locator setting 400 for an entity grounds model 408, in accordance with various embodiments. The entity grounds model 408 includes a mapping of a physical establishment associated with a social network entity to one or more wireless source identifiers representing one or more WAPs located within the physical establishment. The entity grounds model 408 can include a region division map 422 and a region identifier table 424. For example, the physical establishment may be broken up into multiple identified regions 410A-I, each of which can be mapped to a particular WAP (and thus a particular wireless source identifier 412A-C). The regions 410A-I can represent different departments, aisles, floors, etc., within the physical establishment. Note that smaller establishments may only have a single region, while larger establishments can be segmented into many regions.

The entity grounds model 408 may also match each of the wireless source identifiers 412A-C with a region action trigger (e.g., one of region action triggers 414A-C) that specifies what action(s) to take when an end-user device enters the corresponding region. For example, a region action trigger 414A may specify to generate a message (e.g., by a social networking system) that includes promotions for products located within the region 410A or sales for the physical establishment as a whole.

The entity grounds model(s) 408 maintained by a social networking system can be managed using one or more entity-specific locator settings 400. Each entity-specific locator setting 400 can include an entity identifier 402, an entity grounds model identifier 404, and a flag 406 that specifies whether location services (e.g., location service based on wireless source identifiers) have been enabled for the corresponding physical establishment (e.g., by the social network entity). An entity-specific locator setting 400 may include multiple entries corresponding to different physical establishments for the same social network entity. That is, multiple entries having a shared entity identifier 402 and unique entity grounds model identifiers 404. A social network entity can have multiple physical establishments, each of which is associated with a unique entity grounds model 408 having its flag 406 being independently enabled or disabled. Consequently, the social network entity may elect to enable discovery of end-user devices using the entity grounds model(s) 408 on a per-establishment basis.

The social networking system can maintain one or more (e.g., hundreds or thousands of) instances of the entity grounds model 408, as well as instances of the entity-specific locator setting 400 for each social network entity that is associated with at least one of the entity grounds model 408. In some embodiments, a subset of the entity grounds models 408 and/or entity-specific locator settings 400 is transmitted to each end-user device for storage within a local memory (e.g., memory 316 of FIG. 3).

Figure 5:
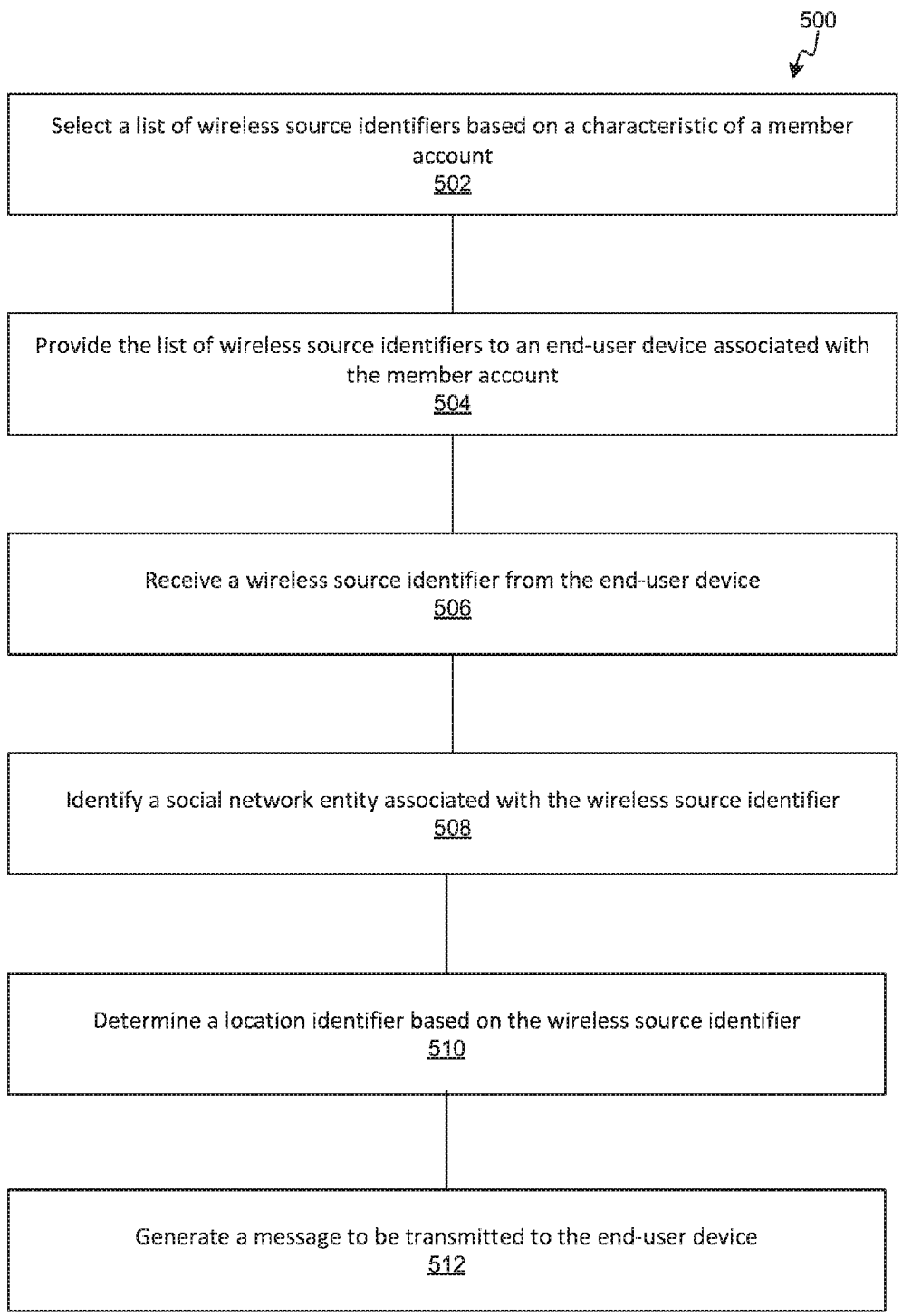
FIG. 5 is a flow diagram illustrating a method of generating a conversational message by a social networking system based on the location of end-user device, in accordance with various embodiments.

FIG. 5 is a flow diagram illustrating a method 500 of generating a conversational message by a social networking system (e.g., social networking system 100 of FIG. 1) based on the location of an end-user device, in accordance with various embodiments. At block 502, the social networking system can select a list of wireless source identifiers (e.g., BSSIDs) based on a characteristic of a member account (e.g., a personal account) associated with a social networking system. The characteristics can be, for example, selected from the account profile of the member account (e.g., the location of a current residence, the location of a current employer, or the locations of one or more social networking "friends"). The social networking system can select wireless source identifiers associated with specific social network entities that are connected to (e.g., directly or within a preset number of indirect connections from) the member account in a social graph of the social networking system.

At block 504, the social networking system can provide the list of wireless source identifiers to an end-user device that is associated with the member account. Examples of the end-user device include smartphones, tablets, personal computers, etc. The list of wireless source identifiers may include some or all of the wireless source identifiers maintained by the social networking system.

At block 506, the social networking system can receive (e.g., via a social networking application) a location identifier from the end-user device. The location identifier can be based on a wireless source identifier discovered by the end-user device when scanning for available WAPs (e.g., in real-time). For example, the location identifier can be the wireless source identifier, a region identifier associated with the wireless source identifier, and/or a social network entity identifier associated with the wireless source identifier. In one example, the social networking system can maintain a list of social network entities associated respectively with the wireless source identifiers in the list. In one example, the social networking system maintains a list of entity-specific region identifiers associated respectively with at least a subset of the wireless source identifiers in the list.

The wireless source identifier may be included in a signal that is emitted by a WAP and is received by the end-user device. At block 508, the social networking system can identify a social network entity (e.g., a corporate account/privileged member account) that is associated with the wireless source identifier. For example, the social networking system may utilize an entity grounds model and/or an entity-specific locator setting to match the wireless source identifier with one of the wireless source identifiers maintained by the social networking system. Additionally or alternatively, the end-user device can attempt to find a match between the wireless source identifier and the list of wireless source identifiers provided by the social networking system.

In embodiments where the social networking system receives the wireless source identifier as the location identifier, at block 510, the social networking system can determine a location coordinate based on the wireless source identifier. For example, the social networking system (or the end-user device) can use an entity grounds model to determine where the end-user device is most likely located within a physical establishment.

At block 512, the social networking system can generate a message to be transmitted to the end-user device. More specifically, the social networking system can create a message that is part of a conversation between a social network entity associated with the physical establishment and a member account that is associated with the end-user device. The content of the message can be based at least in part on the wireless source identifier of the WAP, the location coordinate, and/or or the location identifier, etc. The message may be an interactive message that is triggered by the location coordinate, a particular pattern of conduct by the member account (e.g., repeated or similar responses), etc. The interactive message can be placed in midst of an on-going conversation between the member account and the social network entity. The social networking system can then cause the message to be transmitted back to the end-user device for display to the end user associated with the member account (e.g., via a messaging application associated with the social networking system). In some embodiments, the social networking system configures, based on the location identifier, a conversation engine to interact with the member account on behalf of the social network entity in the conversation.

In some embodiments, the conversation includes at least a user-generated message on behalf of the social network entity and a conversation engine generated message on behalf of the social network entity. In some embodiments, the message is a conversation engine generated text message or a conversation engine generated audio message (e.g., playable on the end user device).

Figure 6:
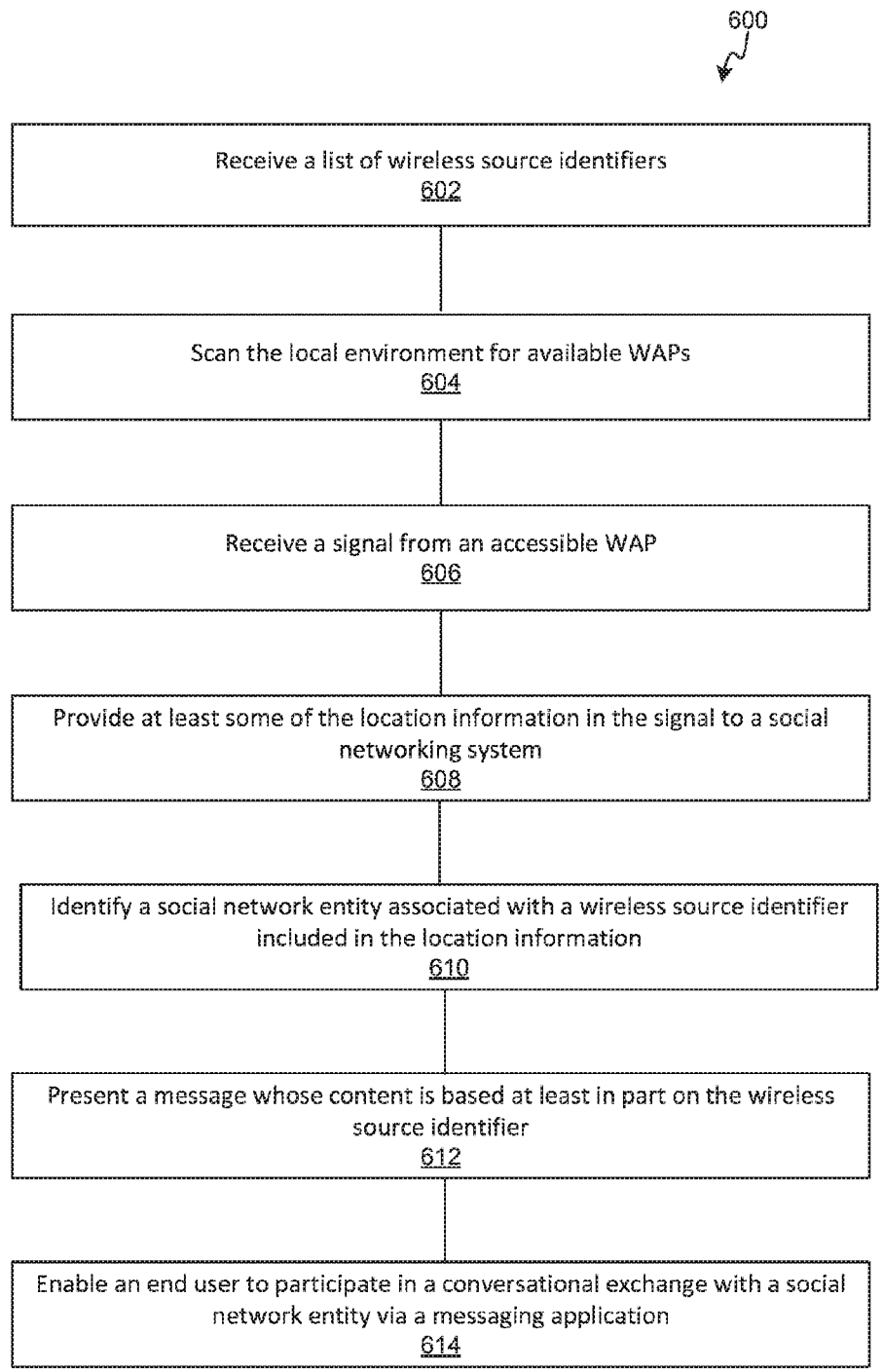
FIG. 6 is a flow diagram illustrating a method of facilitating a conversation that includes messages generated by a location-based conversation engine, in accordance with various embodiments.

FIG. 6 is a flow diagram illustrating a method 600 of facilitating a conversation that includes messages generated by a location-based conversation engine, in accordance with various embodiments. At block 602, an end-user device can receive a list of wireless source identifiers (e.g., BSSIDs) from a social networking system. The list may include some or all of the wireless source identifiers maintained by the social networking system. Each of the wireless source identifiers uniquely identifies a WAP the end-user device may attempt to connect with. Generally, the list includes wireless source identifiers corresponding to WAPS the social networking system has determined the end-user device is most likely to communicate with. The list may be determined based on characteristics of a member account that is associated with the end-user device. For example, the list of wireless source identifiers may only include wireless source identifiers for WAPs within a particular geographic area, for a particular type of store, etc.

At block 604, the end-user device can periodically scan the local environment for available WAPs. For example, the end-user device may scan for accessible WAPs when the end-user device remains in or around a physical establishment (e.g., a store) for a predetermined amount of time. At block 606, the end-user device receives a signal from an accessible WAP that includes location information. The location information can be, for example, a wireless source identifier (e.g., BSSID) that uniquely identifies the WAP responsible for transmitting the signal.

At block 608, the end-user device can provide at least some of the location information to a social networking system. In various embodiments, the wireless source identifier is provided to the social networking system, which determines the location of the end-user device by comparing the wireless source identifier to some or all of the wireless source identifiers maintained by the social networking system. The location information can be provided to the social networking system, for example, via a social networking application and/or a messaging application executed by the operating system of the end-user device.

At block 610, the end-user device can identify a social network entity associated with the wireless source identifier. For example, the end-user device can compare the wireless source identifier with the list of wireless source identifiers transmitted to the end-user device by the social networking system. As another example, the end-user device can identify the social network entity (as well as the location of the end-user device) using an entity-specific locator setting and/or an entity grounds model maintained by the end-user device.

At block 612, the end-user device can present a message (e.g., via the messaging application) whose content is based at least in part on the wireless source identifier. The content can include an advertisement or promotional offers for a physical establishment that includes the WAP associated with the wireless source identifier or a social network entity associated with the physical establishment. At block 614, the end-user device can enable the end user, who is associated with a member account of the social networking system, to participate in a conversation with the social network entity via the messaging application. The message can be an initial message that initiates the conversation or a responsive message whose content may be based on a previous message submitted by the end user (e.g., a weekly advertisement if the end user asks whether the physical establishment is currently offering any sales).

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 7:
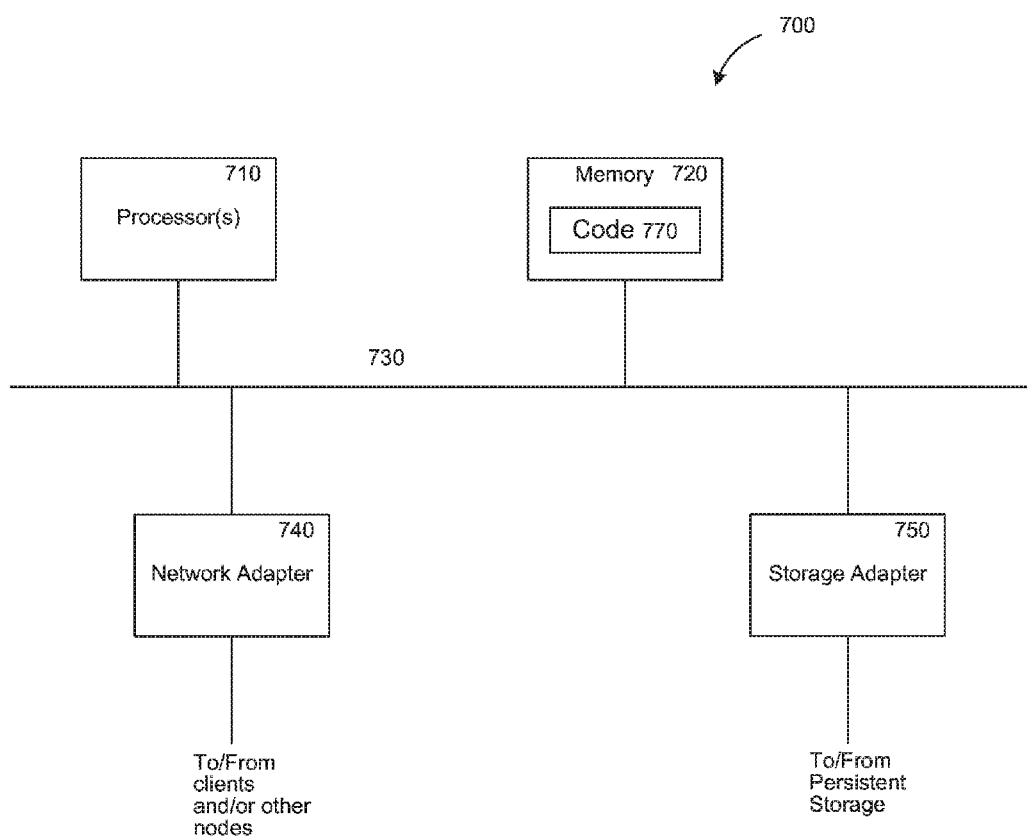
FIG. 7 is a block diagram illustrating an example of a computing device in a social networking system, in accordance with various embodiments.

FIG. 7 is a block diagram illustrating an example of a computing device 700 in a social networking system (e.g., the social networking system 100 and/or the social networking system 200), in accordance with various embodiments. For example, the computing device 700 can represent one or more computing devices in the social networking system 100, and/or methods and processes described in this disclosure. The computing device 700 includes one or more processors 710 and memory 720 coupled to an interconnect 730. The interconnect 730 is an abstraction that represents any one or more separate physical buses, point-to-point connections, or both connected by appropriate bridges, adapters, or controllers. The interconnect 730, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or a "Firewire".

The processor(s) 710 is/are the central processing unit (CPU) of the computing device 700 and thus controls the overall operation of the computing device 700. In certain embodiments, the processor(s) 710 accomplishes this by executing software or firmware stored in memory 720. The processor(s) 710 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 720 is or includes the main memory of the computing device 700. The memory 720 represents any form of random access memory (RAM), read-only memory (ROM), flash memory, or the like, or a combination of such devices. In use, the memory 720 may contain a code 770 containing instructions according to the systems or methods disclosed herein.

Also connected to the processor(s) 710 through the interconnect 730 are a network adapter 740 and a storage adapter 750. The network adapter 740 provides the computing device 700 with the ability to communicate with remote devices (e.g., amongst devices, components, and/or systems described in FIGS. 1-6), over a network and may be, for example, an Ethernet adapter or Fibre Channel adapter. The network adapter 740 may also provide the computing device 700 with the ability to communicate with other computers. The storage adapter 750 enables the computing device 700 to access a persistent storage, and may be, for example, a Fibre Channel adapter or SCSI adapter.

The code 770 stored in memory 720 may be implemented as software and/or firmware to program the processor(s) 710 to carry out actions described above. In certain embodiments, such software or firmware may be initially provided to the computing device 700 by downloading it from a remote system through the computing device 700 (e.g., via network adapter 740).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments," "certain embodiments," or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described that may be requirements for some embodiments but not other embodiments.

What is claimed is:

1. A computer-implemented method, comprising:
   selecting a list of wireless source identifiers associated with one or more social networking entities based on a characteristic of an account profile of a member account associated with a social networking system, wherein the list of wireless source identifiers is a subset of wireless source identifiers maintained by the social networking system;
   determining a location of a computing device without utilizing global positioning system information from the computing device by:
      providing the list of wireless source identifiers to the computing device associated with the member account;
      receiving a wireless source identifier from the list of wireless source identifiers from the computing device in response to an interaction between the computing device and a wireless source associated with the wireless source identifier;
      determining a social networking entity associated with the wireless source identifier from the one or more social networking entities; and
      determining the location of the computing device within a physical establishment associated with the social networking entity based on a combination of the wireless source identifier and the social networking entity; and generating a message based on the determined location of the computing device within the physical establishment associated with the social networking entity; and sending the message in a messaging thread between the determined social networking entity and the member account.

2. The computer-implemented method of claim 1, further comprising generating content of the message based at least in part on an entity-specific region identifier.

3. The computer-implemented method of claim 1, wherein the message is an initial message that initiates the messaging thread.

4. The computer-implemented method of claim 1, wherein the message is an interactive message, in midst of an established messaging thread, triggered by: the determined location, a particular pattern of conduct by the member account, or a combination thereof, wherein the particular pattern of conduct comprises content of responses in the established messaging thread received from the member account.

5. The computer-implemented method of claim 1, wherein the member account is a personal member account representing a person; and wherein the social networking entity is a privileged member account representing an organization or business.

6. The computer-implemented method of claim 1, further comprising maintaining a second account profile of the social networking entity, wherein the second account profile comprises an entity-specific region identifier associated with the determined location.

7. The computer-implemented method of claim 1, wherein each wireless source identifier from the list of wireless source identifiers is a unique or substantially unique basic service set identifier (BSSID).

8. The computer-implemented method of claim 1, wherein the characteristic is a current location specified in the account profile, an address of an employer specified in the account profile, social networking entities associated with the member account in a social graph of the social networking system, or any combination thereof.

9. The computer-implemented method of claim 1, wherein the social networking system maintains a list of social networking entities associated respectively with wireless source identifiers from the list of wireless source identifiers.

10. The computer-implemented method of claim 1, wherein the social networking system maintains a list of entity-specific region identifiers associated respectively with at least the subset of the wireless source identifiers; and wherein the determined location is a region identifier associated with the wireless source identifier.

11. The computer-implemented method of claim 1, wherein the determined location is based on a combination of multiple wireless source identifiers and the social networking entity.

12. The computer-implemented method of claim 1, wherein the messaging thread comprises at least a user-generated message on behalf of the member account and a conversation engine generated message on behalf of the social networking entity.

13. The computer-implemented method of claim 1, wherein the message is a conversation engine generated text message or a conversation engine generated audio message.

14. A system comprising:
a processor; and
a memory device storing executable instructions that, when executed by the processor, cause the system to:

select a list of wireless source identifiers associated with one or more social networking entities based on characteristics of an account profile of a member account associated with a social networking system, wherein the list of wireless source identifiers is a subset of wireless source identifiers maintained by the social networking system;

determine a location of a computing device without utilizing global positioning system information from the computing device by:

providing the list of wireless source identifiers to the computing device associated with the member account;

receiving a wireless source identifier from the list of wireless source identifiers from the computing device in response to an interaction between the computing device and a wireless source associated with the wireless source identifier;

determining a social networking entity associated with the wireless source identifier from the one or more social networking entities; and determine the location of the computing device within a physical establishment associated with the social networking entity based on a combination of the wireless source identifier and the social networking entity; and generate a message based on the determined location of the computing device within the physical establishment associated with the social networking entity; and send the message in a messaging thread between the determined social networking entity and the member account.

15. The system of claim 14, wherein the executable instructions, when executed by the processor, cause the system to determine the location based at least in part on strength of signals received by the computing device from the wireless source associated with the wireless source identifier.

16. The system of claim 14, wherein the executable instructions, when executed by the processor, cause the system to configure, based on the determined location, a conversation engine to interact with the member account on behalf of the social networking entity in the messaging thread.

17. The system of claim 14, wherein the message includes an advertisement, a promotion, an entity-related announcement, an entity-specific loyalty program sign-in confirmation, an electronic menu, a customer service greeting, a description about a physical establishment within which the wireless source identifier is located, or any combination thereof.

18. A non-transitory computer-readable data memory storing computer-executable instructions that, when executed by a computer system, cause the computer system to perform steps comprising:

selecting a list of wireless source identifiers associated with one or more social networking entities based on a characteristic of an account profile of a member account associated with a social networking system, wherein the list of wireless source identifiers is a subset of wireless source identifiers maintained by the social networking system;

determining a location of a computing device without utilizing global positioning system information from the computing device by:

providing the list of wireless source identifiers to the computing device associated with the member account;

receiving a wireless source identifier from the list of wireless source identifiers from the computing device in response to an interaction between the computing device and a wireless source associated with the wireless source identifier;

determining a social networking entity associated with the wireless source identifier from the one or more social networking entities; and determining the location of the computing device within a physical establishment associated with the social networking entity based on a combination of the wireless source identifier and the social networking entity; and generating a message based on the determined location of the computing device within the physical establishment associated with the social networking entity; and sending the message in a messaging thread between the determined social networking entity and the member account.

19. The non-transitory computer-readable data memory of claim 18, the computer-executable instructions when executed by the computer system, further cause the computer system to perform steps comprising determining the location of the computing device based on a combination of an entity-specific region identifier, the wireless source identifier, and the social networking entity.

20. The non-transitory computer-readable data memory of claim 18, wherein the message is an interactive message, in midst of an established messaging thread, triggered by: the determined location, a particular pattern of conduct by the member account, or a combination thereof, wherein the particular pattern of conduct comprises content of responses in the established messaging thread received from the member account.

* * * * *